United States Patent Office 3,220,995
Patented Nov. 30, 1965

3,220,995
PROPYLENE POLYMERIZATION WITH REDUCED TITANIUM HALIDE AND ORGANIC SULFIDE
Eugene L. Stogryn, Fords, and Herbert F. Strohmayer, Roselle, N.J., assignors to Esso Research and Engineering Company, a corporation of Delaware
No Drawing. Filed Oct. 27, 1960, Ser. No. 65,282
4 Claims. (Cl. 260—93.7)

This invention relates to an improved method of preparing polypropylene of greater processability. More particularly it relates to a process of this nature wherein the propylene is polymerized in the presence of a catalytic mixture of a partially reduced titanium halide and an organic sulfide.

In the recent past so-called "low pressure" solid polypropylene has been attracting increasing attention as a plastic competitive with polyethylene. This polymer has been prepared by the now well-known process of polymerizing propylene with catalyst systems made up of reducible, heavy, transition metal compounds and a reducing, metal-containing compound to high density, isotactic, high molecular weight, solid, relatively linear products, e.g. see Belgian Patent 538,782, and "Scientific American," September 1957, pages 98 et seq. One of the problems encountered in the process is that of controlling the molecular weight of the product. In the absence of any control these processes frequently produce polymers of a molecular weight so high and a melt index so low, as to preclude the use of the polymer in many important applications. The melt index of the polymer at a given melt temperature is believed to be determined by the molecular weight of the polymer, e.g. a polymer with a higher molecular weight being less fluid than one with a lower molecular weight. A standard measure of the melt flow of the polymer is the melt index test, described in detail in ASTM-D-1238-52-T. A molecular weight expressed in terms of intrinsic viscosity (measured in tetralin @ 125° C.) of more than 4.0 is usually considered undesirable.

With the increasing use of polypropylene, it is also necessary to be able to modify the properties conveniently so as to meet the demand for a wide spectrum of products. This is necessary because different product characteristics are necessary for different end uses.

It has now been found that polymerizing propylene in the presence of a catalytic mixture of a partially reduced titanium halide and an organic sulfide gives products of markedly improved processability. It is surprising to learn that organic sulfides in the catalytic mixture impart this effect to the product.

The partially reduced titanium halide is obtained by reducing a titanium halide, e.g., $TiCl_4$, $TiBr_4$, etc., with an aluminum alkyl compound, or preferably with metallic aluminum. The particularly preferred material of this type is usually prepared by reducing 1 mole of titanium tetrahalide, usually tetrachloride, with about one-third mole of aluminum to give a material corresponding to $TiCl_3 \cdot 0.33AlCl_3$, thus containing cocrystallized $AlCl_3$. (For further details, see U.S. Patent No. 3,128,252, issued April 7, 1964 and U.S. Patent No. 3,032,513, issued May 1, 1962.) The product is then activated with an aluminum alkyl compound corresponding to the formula RR'AlX. In this formula, R, R' and X preferably are alkyl groups of 2 to 8 carbon atoms, although X may alternatively be hydrogen or a halogen, notably chlorine. Typical examples of the aluminum alkyl compounds are aluminum triethyl, aluminum sesquichloride, aluminum triisobutyl, etc.

The organic sulfide employed in a catalytic mixture with the foregoing materials can be aryl, aralkyl, alkyl and alicyclic. Especially effective and desirable organic sulfides are dibenzyl sulfide, diphenyl sulfide, di-n-butyl sulfide, diisobutyl sulfide and thiophene. The preferred structures for the sulfides are those which have bulky groups and/or aromatic rings attached to the sulfur atom. Sulfur compounds possessing ring sulfur are also effective. These structural features are desirable for good catalyst efficiencies.

The ranges of catalyst components are molar ratio of Al/Ti 1/2–10/1 (based on aluminum alkyl), preferred range 1/1–3/1; molar ratio of organic sulfide/Ti 10/1–1/10, preferred ratio of sulfide/Ti≦3. Ratios greater than 3 cause a marked decrease in catalyst efficiency.

The organic sulfide is mixed with the aluminum alkyl, in the solvent e.g. xylene (0.1 the total volume of solvent). The Ti compound is then added to the solution. If the organic sulfide is added to the Ti compound followed by addition of the Al alkyl the catalyst efficiency drops off.

The propylene is then contacted with the resulting catalyst in the presence of an inert solvent such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.03 to 0.5 wt. percent based on total liquid and the polymer product concentration in the polymerization zone is preferably kept between about 5 to 15 wt. percent based on total solids content so as to allow easy handling of the polymerized mixture. The proper polymer concentration can be obtained by having enough of the inert diluent present or by stopping the polymerization short of 100% conversion of the monomers.

When the desired degree of polymerization has been reached, a $C_1$ to $C_8$ alkanol such as methyl alcohol, isopropyl alcohol or n-butyl alcohol, desirably in combination with a chelating agent for polymer deashing, such as acetylacetone, is normally added to the reaction mixture for the purpose of dissolving and deactivating the catalyst and for precipitating the polymer product from solution. After filtration, the solid polymer may be further washed with water, alcohol or acid, such as hydrochloric acid, dried, compacted and packaged.

This invention and its advantages will be better understood by reference to the following examples.

EXAMPLE I

Polypropylene was prepared with a catalyst system made up of $TiCl_3 \cdot 0.33AlCl_3$ and aluminum triethyl with an aluminum (alkyl) to titanium trichloride ratio of 2:1. This material is characterized as the standard run below. Other catalyst mixtures were prepared incorporating a mole of the indicated organic sulfide/mole of aluminum triethyl/0.5 mole of $TiCl_3 \cdot 0.33AlCl_3$. Other conditions and data where obtained are indicated in the table.

*Propylene polymerization*

[2 hr. run, atmospheric pressure, 75° C.]

| Organic Sulfide | SP/MP, °C. | Density | Tensile | Bell Brit.[1] | Percent Elong. | Mol. Wt. × $10^{-3}$ |
|---|---|---|---|---|---|---|
| Dibenzyl sulfide | | 0.8913 | 2,626 | | | 155 |
| Diphenyl sulfide | 98/113 | 0.8863 | 2,317 | | | 235 |
| Di-n-butyl sulfide | 140/152 | 0.8933 | 3,085 | | | 225 |
| Diisobutyl sulfide | 131/144 | 0.8943 | 3,200 | | | 135 |
| Thiophene | 144/157 | 0.8905 | 2,697 | +25 | 897 | 215 |
| Standard Run | 146/160 | 0.8979 | 3,776 | +45 | 160 | 298 |

[1] Bell Brittleness—ASTM D-746.

This data demonstrate how the molecular weight and melting points of the products were lowered in order to obtain materials of improved processability. Bell brittleness is lowered and percent elongation increased.

The advantages of this invention will be apparent to the skilled in the art. Products of improved processability are obtained and greater flexibility imparted to the operation. This is accomplished without excessive product crystallinity or increasing equipment complexity as occurs with the use of hydrogen. The polymer itself is odorless, which overcomes a shortcoming which sometimes occurs in polymers derived by other processes. The aluminum alkyl and organic sulfide is less pyrophoric than the uncomplexed $AR_3$.

It is to be understood that this invention is not limited to the specific examples which have been offered merely as illustrations and that modifications may be made without departing from the spirit of the invention.

What is claimed is:

1. In the polymerization of propylene to form solid polypropylene, the improvement of preparing polymers of greater processability which comprises effecting the polymerization in the presence of a catalytic mixture of titanium trichloride containing cocrystallized aluminum chloride, aluminum triethyl and dibenzyl sulfide, wherein the molar ratios of Al/Ti are 1/2–10/1 and the dibenzyl sulfide/titanium molar ratios are 10/1–1/10.

2. In the polymerization of propylene to form solid polypropylene, the improvement of preparing polymers of greater processability which comprises effecting the polymerization in the presence of a catalytic mixture of titanium trichloride containing cocrystallized aluminum chloride, aluminum triethyl, and diphenyl sulfide, wherein the molar ratios of Al/Ti are 1/2–10/1 and the diphenyl sulfide/titanium molar ratios are 10/1–1/10.

3. In the polymerization of propylene to form solid polypropylene, the improvement of preparing polymers of greater processability which comprises effecting the polymerization in the presence of a catalytic mixture of titanium trichloride containing cocrystallized aluminum chloride, aluminum triethyl, and thiophene, wherein the molar ratios of Al/Ti are 1/2–10/1 and the thiophene/titanium molar ratios are 10/1–1/10.

4. In the polymerization of propylene to form solid polypropylene, the improvement of preparing polymers of greater processability which comprises effecting the polymerization in the presence of a catalytic mixture of titanium trichloride containing cocrystallized aluminum chloride, an aluminum alkyl compound and an organic sulfide selected from the group consisting of sulfur compounds having aromatic rings attached to the sulfur atom and sulfur ring compounds possessing sulfur in said ring, said mixture formed by first admixing said organic sulfide with said aluminum alkyl prior to mixing with the titanium trichloride compound, the molar ratios of Al/Ti are 1/1–10/1 and the organic sulfide/titanium molar ratios are 10/1–1/10.

References Cited by the Examiner

UNITED STATES PATENTS

| | | | |
|---|---|---|---|
| 2,843,577 | 7/1958 | Friedlander | 260—94.9 |
| 2,886,561 | 5/1959 | Reynolds et al. | 260—94.9 |
| 2,905,645 | 9/1959 | Anderson et al. | 260—94.9 |
| 2,996,459 | 8/1961 | Andersen et al. | 260—94.9 |
| 3,001,951 | 9/1961 | Tornquist et al. | 260—94.9 |
| 3,045,001 | 7/1962 | Berger | 260—93.5 |
| 3,069,446 | 12/1962 | Argabright | 260—429.5 |

FOREIGN PATENTS

| | | |
|---|---|---|
| 1,175,201 | 11/1958 | France. |
| 551,593 | 2/1957 | Belgium. |

JOSEPH L. SCHOFER, *Primary Examiner.*

M. LIEBERMAN, WILLIAM H. SHORT, *Examiners.*